United States Patent
Bell et al.

(10) Patent No.: US 11,295,344 B2
(45) Date of Patent: Apr. 5, 2022

(54) DIGITAL ADVERTISING SYSTEM AND METHOD

(71) Applicant: Rokt Pte Ltd, Singapore (SG)

(72) Inventors: Seth Bell, Manly (AU); Justin Viles, Seaforth (AU); Ben Voltz, Paddington (AU); James Voltz, Northbridge (AU); Bruce Buchanan, Clovelly (AU)

( * ) Notice: Subject to any disclaimer, the term of this patent is extended or adjusted under 35 U.S.C. 154(b) by 0 days.

(21) Appl. No.: 15/608,096

(22) Filed: May 30, 2017

(65) Prior Publication Data

US 2017/0262897 A1   Sep. 14, 2017

Related U.S. Application Data

(63) Continuation of application No. 14/482,699, filed on Sep. 10, 2014, now abandoned, and a continuation-in-part of application No. 13/804,848, filed on Mar. 14, 2013, now abandoned.

(30) Foreign Application Priority Data

Dec. 12, 2012  (AU) ................................ 2012905431
Mar. 11, 2013  (AU) ................................ 2013900836
Sep. 11, 2013  (AU) ................................ 2013228001

(51) Int. Cl.
G06Q 30/00   (2012.01)
G06Q 30/02   (2012.01)

(52) U.S. Cl.
CPC ..... *G06Q 30/0269* (2013.01); *G06Q 30/0242* (2013.01); *G06Q 30/0255* (2013.01)

(58) Field of Classification Search
CPC .......... G06Q 30/0243; G06Q 30/0251; G06Q 30/0255; G06Q 30/0269
See application file for complete search history.

(56) References Cited

U.S. PATENT DOCUMENTS 8,346,781 B1 *  1/2013  Cornelius .......... G06Q 30/0241
                                                       707/748
9,875,286 B1 *  1/2018  Lewis ............... G06F 16/24578
(Continued)

OTHER PUBLICATIONS

Shim; Influencing_Factors_on_the_Evolution_of_User_Created_Content_Based_on_Meta_Analysis; ICALP 2007, pp. 251-256; 2007.*
(Continued)

*Primary Examiner* — Radu Andrei
(74) *Attorney, Agent, or Firm* — Davidson Berquist Jackson & Gowdey, LLP

(57) ABSTRACT

A computer system for providing digital advertiser referrals comprising a third party referral provider operable to maintain a store of digital referral objects, each digital referral object associated with an advertiser for referral to a consumer. The third party referral provider being further operable to engage with a consumer while the consumer is accessing digital content on a publisher site subscribing to the third party referral provider by way of a computer presentation interface, such that once the consumer has engaged with the third party referral provider, the third party referral provider is operable to refer one or more of the advertisers to the consumer through presentation of an associated digital referral object on the presentation interface.

19 Claims, 7 Drawing Sheets

(56) References Cited

U.S. PATENT DOCUMENTS

| | | | |
|---|---|---|---|
| 2003/0204448 A1* | 10/2003 | Vishik | G06Q 30/0633 705/26.4 |
| 2004/0186766 A1* | 9/2004 | Fellenstein | G06Q 10/107 705/14.56 |
| 2006/0041435 A1* | 2/2006 | Knorr | G06Q 30/08 705/1.1 |
| 2006/0253330 A1* | 11/2006 | Maggio | G06Q 30/0257 705/14.2 |
| 2007/0067297 A1* | 3/2007 | Kublickis | G06Q 30/02 |
| 2007/0112689 A1* | 5/2007 | Brown | G06Q 30/00 705/319 |
| 2007/0204002 A1* | 8/2007 | Calderone | G06Q 30/02 709/217 |
| 2008/0065507 A1* | 3/2008 | Morrison | G06Q 30/0613 705/26.3 |
| 2010/0010822 A1* | 1/2010 | Bal | G06Q 30/02 705/1.1 |
| 2011/0218858 A1* | 9/2011 | Christensen | G06Q 30/0253 705/14.51 |
| 2011/0258039 A1* | 10/2011 | Patwa | G06Q 30/00 705/14.45 |
| 2011/0282739 A1* | 11/2011 | Mashinsky | G06Q 30/02 705/14.53 |
| 2012/0110618 A1* | 5/2012 | Kilar | G06Q 30/02 725/34 |
| 2012/0158494 A1* | 6/2012 | Reis | G06Q 30/0241 705/14.49 |
| 2012/0209706 A1* | 8/2012 | Ramer | G06F 17/30867 705/14.51 |
| 2012/0232985 A1* | 9/2012 | Lasker | G06Q 30/02 705/14.41 |
| 2012/0323656 A1* | 12/2012 | Leach | G06Q 30/0239 705/14.17 |
| 2012/0324008 A1* | 12/2012 | Werz, III | G06Q 30/02 709/204 |
| 2013/0291079 A1* | 10/2013 | Lowe | G06F 21/00 726/7 |
| 2014/0101064 A1* | 4/2014 | Bedard | G06Q 50/01 705/319 |
| 2016/0044083 A1* | 2/2016 | Galloway | H04L 67/32 709/217 |
| 2018/0107667 A1* | 4/2018 | Lewis | G06F 16/24578 |

OTHER PUBLICATIONS

Turow; The_Internet_as_a_Test_Bed; book, chapter4, pp. 72-89; 2012.*

* cited by examiner

DIGITAL ADVERTISING SYSTEM AND METHOD

FIELD OF THE INVENTION

The present invention relates generally to digital advertising systems and methods.

BACKGROUND OF THE INVENTION

Typical digital advertising currently falls under two main categories, namely "search-based" advertising and "display-based" adverting. Both forms of digital advertising provide advertising relevance through active targeting.

Search-based advertising involves presenting advertisements to computer users (referred to herein interchangeably as "consumers") based on keyword searches made by the consumers whilst performing on-line searching (e.g. using Google™, Yahoo™ and the like). Advertisers bid on keywords they would like to appear alongside (e.g. in the results page) and are typically charged on a performance based model (e.g. a "cost-per-click" model) when a consumer engages with their advertisement.

Display-based advertising involves presenting images and/or flash animation to consumers whilst consuming content across online and mobile environments. Normally advertisers using this mode of advertising are charged on a cost-per-impression (CPM) or cost-per-click (CPC) model. Traditionally, display advertisers would target their advertisements in association with a type of content currently being consumed by the consumer. In recent times, display-based advertising has evolved to additionally evaluate attributes of the consumer in order to better target the advertisements displayed to the consumer.

While digital search and display-based advertising are currently regarded as the most effective way for presenting advertising to consumers of digital content, the actual consumer engagement levels are still very low (often resulting in less than 0.1% of consumers actively following up on the advertisement).

SUMMARY OF THE INVENTION

In accordance with a first aspect of the present invention there is provided a computer implemented method for providing digital referrals, the method comprising: maintaining a store of digital referral objects, each digital referral object associated with an advertiser for referral to a consumer; facilitating a consumer engagement with a third party referral provider while the consumer is accessing digital content on a subscribing publisher site; and once the consumer has engaged with the third party referral provider, referring one or more of the advertisers to the consumer through presentation of an associated digital referral object.

In an embodiment the engagement is facilitated by way of an engagement offer presented to the consumer while the consumer is interfacing with the subscribing publisher site.

In an embodiment the engagement offer is an offering determined to be of interest to the consumer based on one or more of an interfacing context and consumer demographic.

In an embodiment the presentation of the engagement offer to the consumer provides no direct advertising benefit to the advertisers referred to the consumer post engagement.

In an embodiment a plurality of different publishers subscribe to the third party referral provider such that the consumer can engage with the third party referral provider while accessing any one of the different publisher sites.

In an embodiment the digital referral object comprises an offering related to goods and/or services provided by the advertiser.

In an embodiment the method further comprises causing a communication to be sent from the subscribing publisher to the consumer endorsing the advertiser associated with the presented digital referral object after the consumer has accepted the corresponding offering.

In an embodiment the method further comprises identifying one or more attributes of the engagement and wherein each of the digital referral objects are associated with one or more identifiable engagement attributes.

In an embodiment the method further comprises selecting the digital referral object for presenting to the consumer based on an association with the identified engagement attribute(s).

In an embodiment the engagement attributes are associated with identifiable consumer attributes selected from the following: consumer age, consumer gender, consumer location.

In an embodiment the engagement attributes are associated with identifiable interfacing context parameters, including: time that the consumer is interfacing with the digital content, digital content type.

In an embodiment the association between the digital referral object and engagement attribute(s) is specified by the corresponding advertiser.

In an embodiment the method further comprises deriving revenue from the advertiser associated with the digital referral presented to the consumer.

In an embodiment the third party referral provider derives revenue from an advertiser responsive to the consumer indicating that they are interested offering associated with the digital referral object.

In an embodiment an amount paid by the advertiser for the referral is determined, at least in part, based on a number of other advertiser referral objects associated with the same identifiable engagement attributes.

In an embodiment the method further comprises determining a performance of the digital referral object and wherein the performance is evaluated when determining whether to present the digital referral object to a consumer during a subsequent engagement with the third party referral provider.

In an embodiment the performance is determined by evaluating whether the consumer accepted an offering associated with the digital referral object.

In an embodiment the offering is to find out more about goods and/or services provided by the advertiser and wherein following acceptance of the offer, the consumer is contacted by the advertiser.

In an embodiment the method further comprises the third party referral provider providing contact details of the consumer to the advertiser for making the contact.

In an embodiment the offering is to receive ongoing communications from the advertiser and wherein following an acceptance of the offer, the consumer is automatically added to a mailing list for receiving on-going communications from the advertiser.

In an embodiment the offering is a retail related offering for goods and/or services sold by the advertiser selected from the group comprising: discounts, coupons, loyalty points, entry into a prize draw and free membership.

In an embodiment, following an acceptance of the retail related offering, the consumer is directed to a website for conducting an e-commerce transaction to complete the retail related offering.

In an embodiment in order to accept the offering the consumer is required to endorse the advertiser through a social media channel.

In accordance with a second aspect there is provided a computer system for providing digital advertiser referrals, the system comprising: a third party referral provider operable to maintain a store of digital referral objects, each digital referral object associated with an advertiser for referral to a consumer, the third party referral provider being further operable to engage with a consumer while the consumer is accessing digital content on a publisher site subscribing to the third party referral provider by way of a computer presentation interface, such that once the consumer has engaged with the third party referral provider, the third party referral provider is operable to refer one or more of the advertisers to the consumer through presentation of an associated digital referral object on the presentation interface.

In an embodiment the engagement is facilitated by way of an engagement offer presented to the consumer while the consumer is interfacing with the subscribing publisher site.

In an embodiment the engagement offer is determined to be of interest to the consumer based on one or more of an interfacing context and consumer demographic determined by the third party referral provider.

In an embodiment the presentation of the engagement offer to the consumer provides no direct advertising benefit to the advertisers referred to the consumer post engagement.

In an embodiment the subscribing publisher site is a website and wherein the engagement object is presented to the consumer by way of script which is communicated with computer code delivered to the presentation interface by the subscribing publisher site for rendering the digital content.

In an embodiment a plurality of different publisher sites subscribe to the third party referral provider such that the consumer can engage with the third party referral provider while accessing any one of the different publisher sites.

In an embodiment the digital referral object comprises an offering related to goods and/or services provided by the advertiser.

In an embodiment the third party referral provider is further operable to facilitate a communication from the subscribing publisher site to the consumer endorsing the advertiser responsive to the consumer accepting the good and/or services related offering.

In an embodiment the third party referral provider is further operable to identify one or more attributes of the engagement and wherein each of the digital referral objects maintained by the third party referral provider are associated with one or more identifiable engagement attributes.

In an embodiment the third party referral provider is operable to select the digital referral object for presenting to the consumer based on an association with the identified engagement attribute(s).

In an embodiment the engagement attributes are associated with identifiable consumer attributes selected from the following: consumer age, consumer gender, consumer location.

In an embodiment the engagement attributes are associated with identifiable interfacing context parameters, including: a time that the consumer is interfacing with the digital content, nature of the digital content.

In an embodiment the association between the digital referral object and engagement attribute(s) is specified by the corresponding advertiser.

In an embodiment the third party referral provider derives revenue from the advertiser associated with the digital referral presented to the consumer.

In an embodiment an amount paid by the advertiser for the referral is determined, at least in part, based on a number of other advertiser referral objects associated with the same identifiable engagement attributes.

In an embodiment the third party referral provider is further operable to determine a performance of the digital referral object and wherein the performance is evaluated when determining whether to present the digital referral object to a consumer during a subsequent engagement with the third party referral provider.

In an embodiment the performance is determined by evaluating whether the consumer accepted the corresponding offering.

In accordance with a still further aspect there is provided non-transitory computer readable medium providing a computer program which, when implemented by a computer, is operable to cause the computer to carry out the method in accordance with the method as described herein.

In accordance with yet another aspect there is provided a computer implemented method for providing digital referrals to a consumer, the method comprising: receiving computer executable code while accessing a publisher website via a browser or native mobile application, the computer executable code being executable by the browser/native mobile application to establish a communication with a third party referral provider to which the publisher website subscribes, the third party referral provider maintaining a store of digital referral objects which are each associated with an advertiser for referral to the consumer; and once the communication has been established, referring one or more of the advertisers to the consumer through presentation of an associated digital referral object via the browser/mobile application.

In the context of the present specification the term 'digital content' is to be construed in a broad sense and will be understood to include within its scope any form of visible and/or audible digital content. Non-limiting examples include digital content found on online sources (e.g. web pages, mobile applications, etc.) providing publications (e.g. news websites), e-commerce listings (e.g. eBay listings), articles, pictures, videos (e.g. YouTube, Vimeo, etc.), audio files (e.g. digital music downloaded through a website), charts, and the like.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

Embodiments of the invention described herein relate to methods for presenting advertisements to a computer user (hereafter "consumer") while viewing or otherwise interfacing with any form of digital content (provided by a publisher) on their computer device. Herein, the term "interfacing" is to be construed in a broad sense and includes within its scope scenarios where the user is actively interfacing with the digital content (e.g. selecting content, inputting data, entering instructions, or otherwise actively interacting with the digital content), as well as scenarios where the user is simply viewing or otherwise passively interfacing with the digital content.

Figure 1:
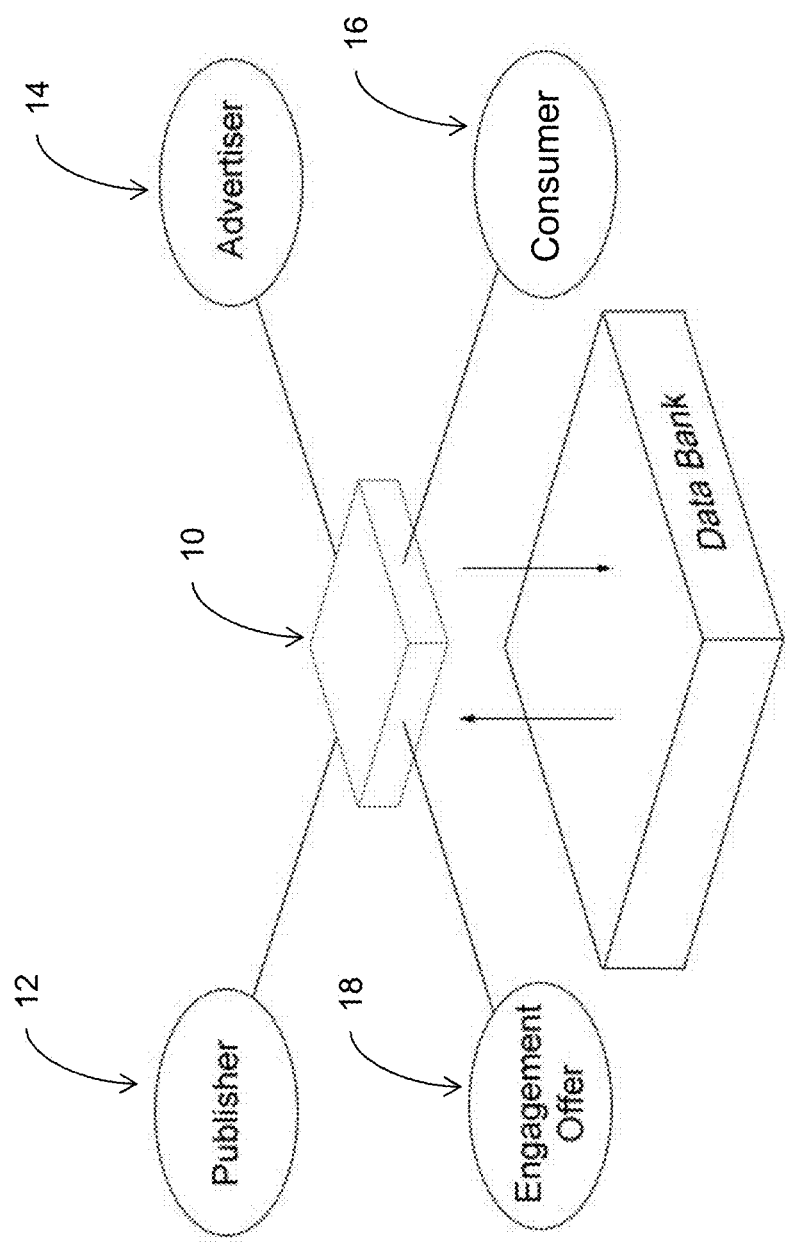
FIG. 1 is a schematic of a four dimensional advertisement model, in accordance with an embodiment of the present invention.

More particularly, and with reference to FIG. 1, embodiments of the present invention relate to a four dimensional advertising model hosted by an advertisement system 10 that includes a suitable computing system and associated hardware/software. The advertising model takes into consideration the interests of the publishers 12, advertisers 14 and consumers 16, as will become evident from the following description.

Key to the four dimensional advertising model is an "engagement offer" 18, which term is used herein to refer to any form of offer which is either contextually relevant to how the consumer is interfacing with the digital content and/or relevant to one or more user attributes of the consumer. The engagement offer 18 is displayed in association with the digital content and aims to encourage the user to engage with the offer, which according to embodiments described herein involves, for example, the consumer selecting the engagement offer (e.g. by way of a mouse click, touch screen selection or some other suitable offer selection). In this sense, the engagement offer 18 differs from traditional digital advertisements in that its primary function is not to sell a particular product or service, but instead is a mechanism for encouraging the consumer to initially engage with the advertisement system 10 in a positive sense.

A non-exhaustive list of the different types of engagement offers 18 that may be presented to a consumer according to embodiments described herein, include:
 coupons, discounts, vouchers, credits for goods/services
 simulated "scratch and win" games, potentially revealing a prize
 transaction relevant offers (e.g. chance to win back, or discounts, etc. on related transactions)
 surveys and polls (which typically display results)
 opportunities to participate in audience profiling or market research
 competitions
 sampling (products)
 video images and/or audio content
 free games
 access to exclusive/deeper/additional publisher content
 award points (e.g. loyalty points, frequent flyer points, etc.)
 cash back offers Responsive to the consumer engaging with the engagement offer 18, they are taken on an "engagement journey" which involves presenting the consumer with one of more advertisements (paid for by the advertisers 14) that are tailored for the consumer based, at least in part, on behavioural, contextual and/or demographic attributes determined by the advertising system 10.

Through extensive testing, it has been found that initiating engagement with the advertisement system 10 by way of an engagement offer results in a more positive and deeper engagement with advertisements subsequently presented to the consumer (i.e. during the engagement journey) than if those advertisements were presented in the traditional search or display based manner, as described in the preamble. In turn, the consumer is more likely to continue to engage with the advertisement system 10, thus creating a sustainable advertising revenue module which is of benefit to each of the advertisement system 10, publishers 12 and advertisers 14.

According to particular embodiments, the engagement offer 18 does not directly translate into any advertising revenue (indeed, in particular embodiments where the offer relates to a prize or the like, the offer may in fact represent an initial cost to the advertisement system 10 and/or the other parties shown in the four dimensional model of FIG. 1). In contrast, the advertisements presented thereafter (which may be any suitable form of digital advertisement) will typically result in advertisement revenue being generated through presentation to the consumer, based on any suitable payment scheme agreed by the advertisement system 10 and the individual advertisers 14. It will also be apparent that the presentation of the engagement offer to the consumer does not result in any predetermined or correlated direct advertising benefit to the particular advertisers of the advertisements subsequently presented to the consumer. This is because the engagement offer selected by the system 10 is not tied to any of the paid advertisements (i.e. the engagement offer is selected by the system 10 in independence of the paid advertisements).

Basic Process Flow

Figure 2:
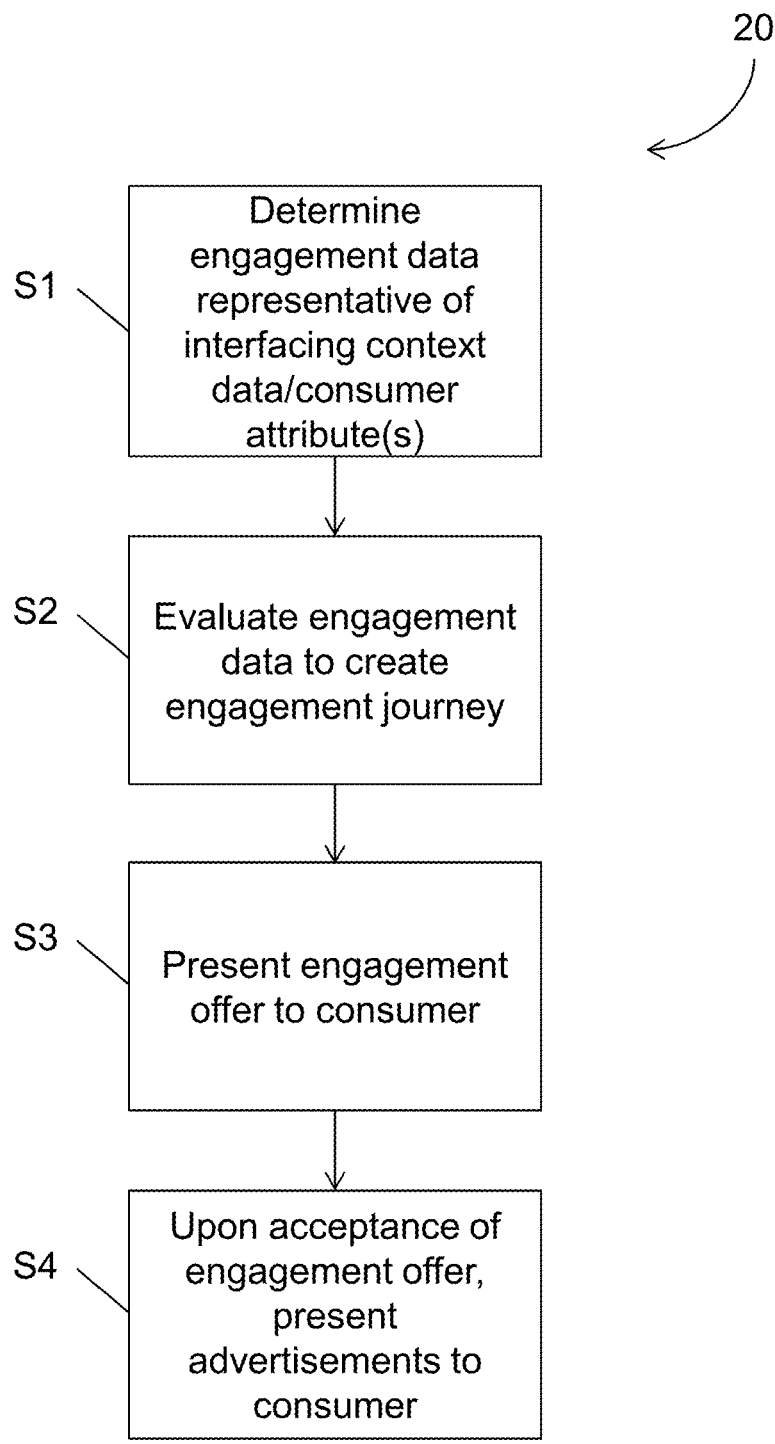
FIG. 2 is a basic process flow for an embodiment of the present invention.

With additional reference to FIG. 2, there is shown a basic process flow 20 for engaging with a consumer who is interfacing with digital content provided by a publisher 12 (e.g. by way of a browser, mobile application, or via some other suitable digital medium).

Step S1 involves determining the interfacing context and/or consumer attribute(s) data, responsive to the occurrence of an engagement trigger. As will be described in more detail in subsequent paragraphs, the interfacing context and/or consumer attribute(s) are determined from engagement data collected while the consumer is interfacing with the digital content.

The engagement trigger may comprise or be supplied by the consumer completing a transaction, uploading or downloading a file, submitting a post in a forum, entering a competition, loading a webpage, or based on any other predefined identifiable consumer response or action.

At step S2, the engagement data together with any other data deemed relevant for the engagement (e.g. behavioural data, demographic data) is evaluated by the advertisement system 10 to generate a tailored engagement journey for the consumer, that can include, for example, an initial engagement offer 18, followed by one or more advertisements from am advertiser 14.

At step S3, the engagement offer 18 is presented to the consumer 16. The engagement offer may, for example, be presented via the display on their computing device as text (e.g. in-line with the digital content, or overlayed), in a flash banner, by way of audio content and/or video images, messaging (e.g. text message), or via any other suitable presentation means. The mechanism used to carry the engagement offer 18 is herein referred to as an "asset".

At step S4, responsive to the consumer 16 engaging with the engagement offer 18, the consumer 16 continues on the engagement journey, during which they are presented with the one or more advertisements determined in step S2. The advertisements are presented to the consumer in a sequence of "modules". The modules may, for example, be pop-up banners, forms or the like suitable for conveying the advertisement. It will be understood that each of the modules presented to the consumer 16 during the journey may have different functional and aesthetic variations.

Example System Configuration

Figure 3:
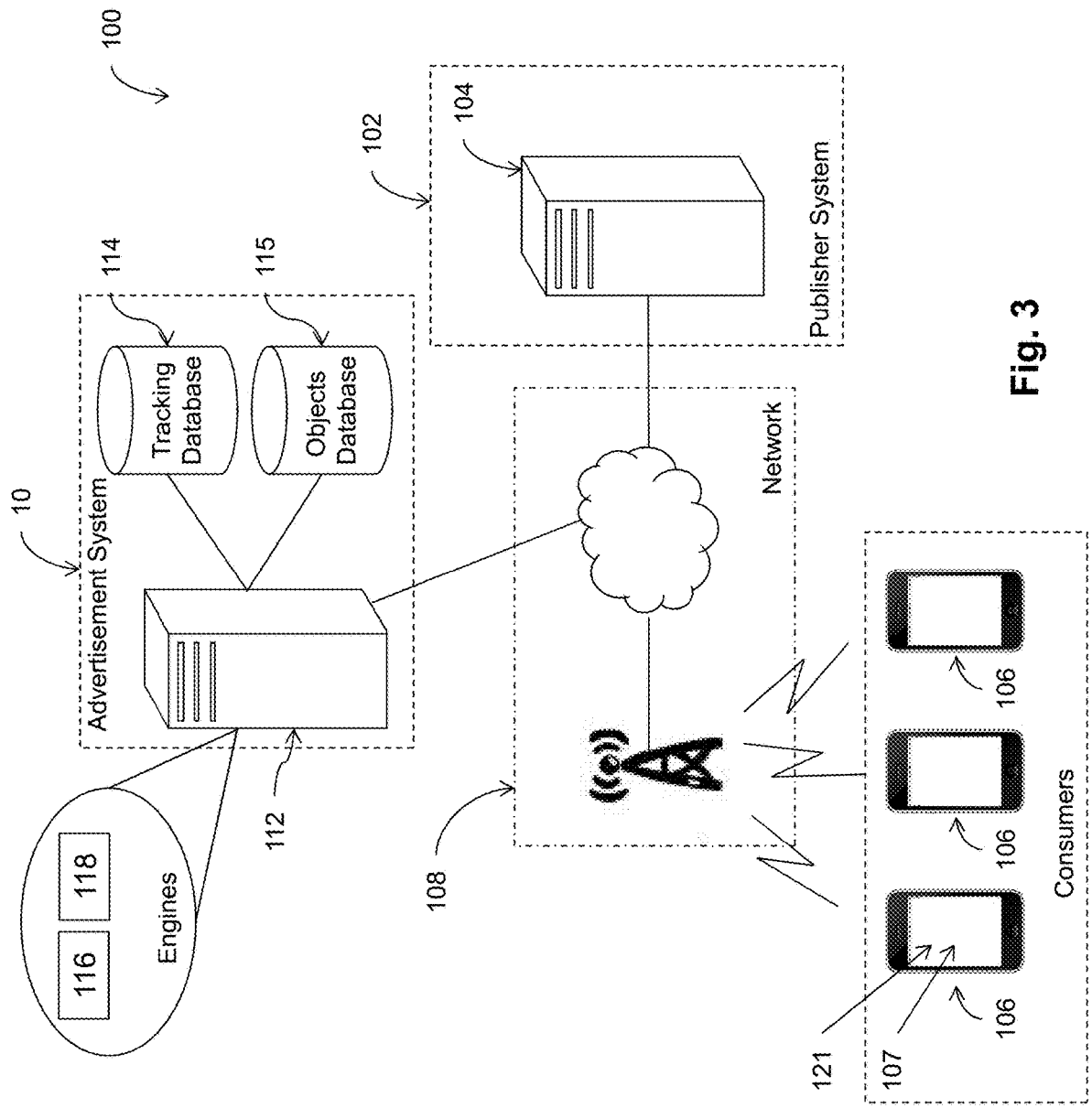
FIG. 3 is a schematic of a system for implementing an embodiment of the present invention.

With reference to FIG. 3, there is a shown an example of a computing system 100 in which an embodiment of the invention may be implemented. The computing system 100 comprises a publisher system 102 comprising a web server computer 104 hosting a website which presents publisher content.

One or more consumer computer devices (in this case being in the form of Internet-enabled smartphones 106 or other consumer digital device) communicate with the website via a client browser 107 resident thereon. The communication is made over a network in the form of a mobile broadband communications network 108. According to embodiments described herein, the website is optimised for a mobile browser.

A computer readable script 121, hereafter referred to as a "widget script", is placed within the publisher content (in the presently described embodiment, being communicated with the HTML page code for the website). The widget script 121 is executed client-side (i.e. on the client browser) and is operable to gather and communicate the engagement data to the advertisement system 10, and thereafter generate and display engagement journey objects on a consumer browser 107.

The widget script 121 is further operable to track behavioural metrics which are representative of a level/measure of engagement for the consumer during an engagement journey. According to one, exemplary illustrated embodiment, the behavioural metrics are tracked by API calls generated by the widget script 121 and include the following metrics relevant to each engagement offer 18, asset, advertisement and module (hereafter collectively referred to as "engagement objects") presented to the consumer during an engagement journey:

- asset impressions—a count for each asset which is incremented whenever the asset was displayed in the browser 107
- asset clicks—a count for each asset which is incremented whenever the consumer clicks on (or otherwise selects) the asset;
- engagement offer take-ups—a count for each engagement offer which is incremented whenever the consumer accepts the engagement offer (e.g. selects a button agreeing to take up the offer);
- engagement offer skips/declines—a count for each engagement offer which is incremented whenever the consumer exits or continues on the engagement journey without taking up the engagement offer;
- module impressions—a count for each module which is incremented whenever the module is rendered by the widget script 121;
- module completions—a count for each module which is incremented whenever the consumer completes the module (e.g. by transitioning to another module or reaching an exit stage);
- advertisement impressions—a count for each advertisement which is incremented whenever an advertisement is rendered into a module by the widget script 121;
- advertisement take-ups—a count for each advertisement which is incremented whenever the consumer accepts an advertised offer;
- request further information—a count for each advertisement which is incremented whenever the consumer requests further information about the advertisement before taking up the offer or passing on the offer;
- advertisement skips—a count for each advertisement which is incremented every time a consumer does not take up an offer;
- advertisement declines—a count for each advertisement which is incremented each time a consumer actively declines an advertised offer (e.g. selects a reject button for the displayed advertised offer);
- advertisement shares—a count for each advertisement or engagement offer which is incremented each time a consumer shares the offer/advertisement with another person (e.g. through selection of a share icon which, once selected, is operable to send a URL link for a webpage displaying the offer/advertisement to the other person by way of a sharing or social media platform/service such as Twitter, Facebook, SMS or the like)

Figure 4:
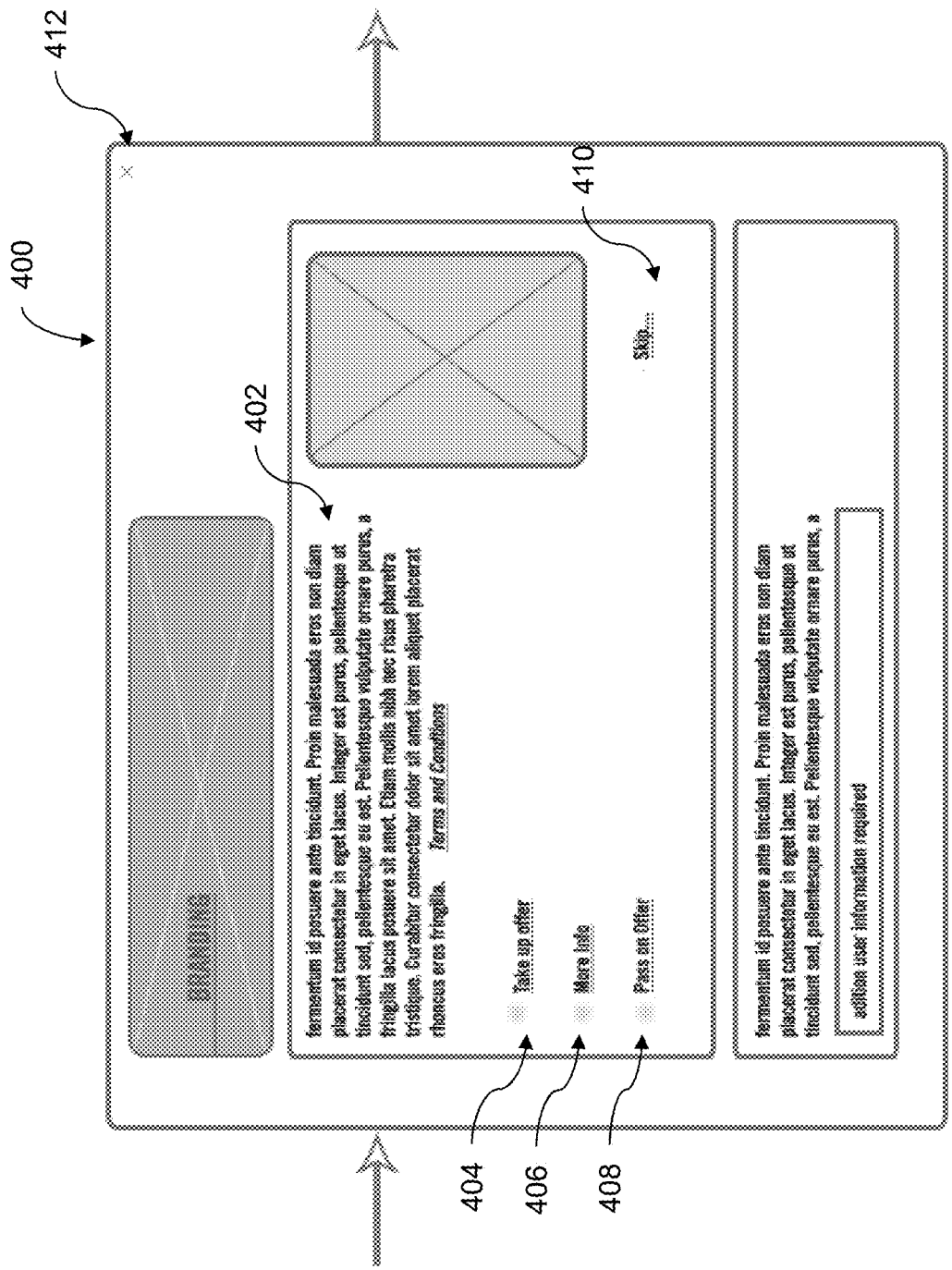
FIG. 4 is an example screen shot illustrating engagement points for a survey module, in accordance with an embodiment.

With additional reference to FIG. 4, there is shown a screen shot of an example coupon module 400 illustrating engagement points (in this case comprising a combination of radio buttons and selectable text) that are selectable by a consumer and which are recognisable by the widget script 121, once selected, to increment the count for a particular behavioural metric. As shown in FIG. 4, an advertised offer 402 is presented by the widget script 121 within the coupon module 400. At this point, the widget script 121 would have already incremented both a module impression and an advertisement impression count for the selected coupon module and advertisement. A selectable "take up offer" radio button 404 is recognised by the widget script 121 as an acceptance of the advertised offer. Also displayed are "more info" and "pass on offer" radio buttons 406, 408 which, once selected, are recognised by the widget script 121 for incrementing the "further information" and "advertisement declines" counts respectively. Skipping to the next module through selection of the "skip" radio button 410 is recognised by the widget script 121 for incrementing the "advertisement skip" count. Equally, closing the module by selecting exit button 412 is also recognised for incrementing the "advertisement skip" count.

The metrics shown above should not be seen as limiting and it will be understood that any suitable behavioural metric and associated engagement point could be implemented, depending only on the desired implementation.

Returning to FIG. 3, the advertisement system 10 comprises a server computer 112 hosting an engagement tracking database 114 (for storing the engagement data and behavioural metrics as afore-described) and an engagement objects database 115 storing the particular engagement objects, which can include engagement offers, assets, advertisements and modules. Each of the objects in the database 114 are stored in association with one or more relevant interfacing contexts and/or consumer user attributes. The server computer 112 additionally implements an engagement engine 116 and ranking engine 118 which are communicable with the respective databases 114 and 115 for dynamically generating consumer engagement journeys, as will be described in more detail below.

Engagement and Tracking Metrics

As mentioned above, the widget script 121 is operable to gather engagement data and track behavioural metrics. A particular embodiment illustrating this operation will now be described in more detail with reference to process flow diagram of FIG. 5.

Figure 5:
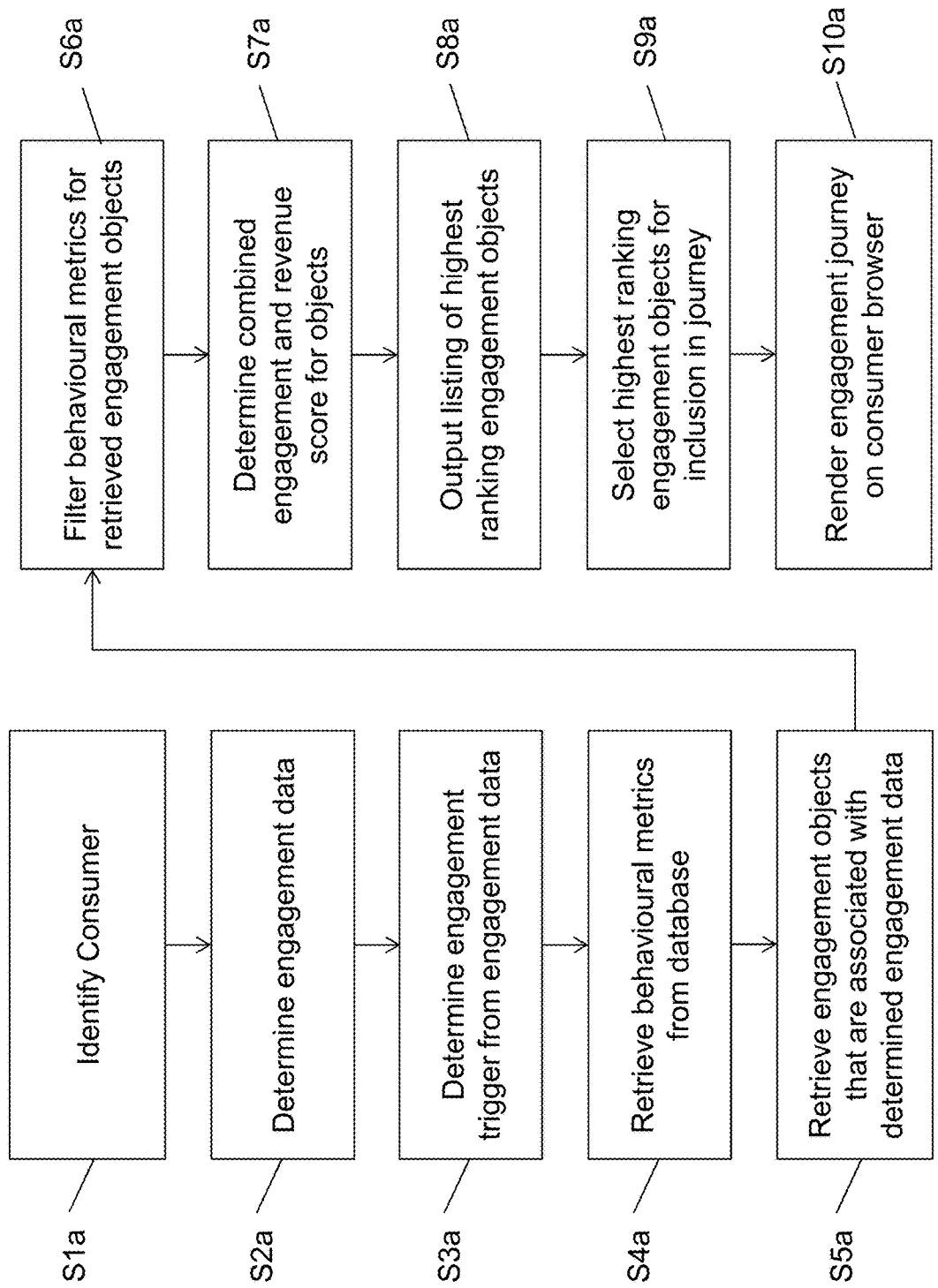
FIG. 5 is a detailed process flow, according to an embodiment of the present invention.

According to the embodiment shown in FIG. 5, the first step S1a involves identifying the consumer 16. More particularly, each time the consumer accesses the publisher website, the widget script 121 is invoked to retrieve a unique identifier for the consumer.

According to the illustrated example, the unique identifier is created when the consumer 16 first engages with the advertisement system 10 and is held by a cookie in the consumer's client browser 107. The unique identifier is used by the widget script 121 for recording the behavioural metrics generated while completing an engagement journey (which metrics are subsequently communicated to the engagement engine 116 for storing in the tracking database 114, in association with the unique identifier for the consumer).

In instances where the widget script 121 is unable to locate a unique consumer identifier, the engagement engine 116 may instruct the widget script to display a signup module (selected from the objects database 115) for the purpose of gathering user attribute data that may be used to identify the consumer 16. In a particular embodiment, the signup module may ask the consumer to provide an e-mail address which, if matched against a consumer e-mail address stored in the tracking database 114, overrides any match determined when looking up the consumer via the unique identifier in their cookie.

In an alternative embodiment, the publisher system 102 may store user attribute data for the consumer which can be passed directly to the widget script 121 upon request, via an API call. Such user attribute data may, for example, comprise personal and/or demographic information entered by the consumer when registering with the publisher system 102, a history of products purchased by the consumer, pages visited by the consumer, among others.

At step S2a, the widget script 121 determines engagement data representative of the interfacing context. In a particular embodiment, the engagement data determined by the widget script 121 comprises at least one of the following: a URL for the website; a referring URL; screen content obtained through capturing the HTML of a current page for particular keywords and content (also known in the industry as "scraping"); through API (application programming interface) parameters passed directly to the widget script 121 by the publisher 102; a current location of the consumer; a time at the current location; a type of network over which the consumer is making the connection (e.g. wi-fi hotspot, cellular network, etc.); and/or any other data that can be determined in order to glean an understanding of how the consumer is interfacing with the digital content.

By way of example, where the consumer is interfacing with an e-commerce website, the engagement data determined by the widget script 121 may include data representative one or more attributes relating to a current transaction (e.g. type, cost, location of goods/services) that the consumer has made or in the process of making, collected through scraping the page for content. As another example, the consumer may be reading an article or other content displayed on a page of the website. In this case, the engagement data may be representative of an attribute of the content (e.g. type of content, where the content is being displayed, an author of the content, etc.), which is provided by the publisher API (or through any one of the other techniques described above).

Generating Engagement Journeys

Still with reference to FIG. 5, at step S3 the engagement engine 116 determines an engagement trigger from the engagement data communicated from the widget script 121.

At step S4a, responsive to determining the engagement trigger, the engagement engine 116 retrieves all behavioural metrics recorded for that consumer from the tracking database 114. Depending on the desired implementation, the engagement engine 116 may additionally or alternatively retrieve behavioural metrics in aggregated form for other consumers who have the same or like demographic (e.g. age, gender, etc.). In a particular embodiment, the engagement engine 116 may limit the behavioural metrics to be retrieved to some desired period of time (e.g. within the last 3 months).

At step S5a, the engagement engine 116 passes the retrieved behavioural metrics as well as the contextually relevant engagement data gathered by the widget script 121 to the ranking engine 118. The ranking engine 118 in turn retrieves objects from the engagement object database 115 that match (i.e. are stored in association with) an interfacing context and/or consumer attribute(s) derived from the engagement data provided to the ranking engine 118.

At step S6a, the ranking engine 118 filters the retrieved behavioural metrics such that only those metrics relevant to the retrieved objects are kept for evaluation.

At step S7a, the ranking engine 118 implements a ranking algorithm which ranks the retrieved objects by a combination of an engagement score and revenue score (where applicable), as will now be described.

As its name suggests, the engagement score is associated with how well the consumer engages with the object and is determined based on the behavioural metrics recorded for that object. According to the illustrated embodiment, each type of behavioural metric is assigned a particular positive or negative score per recorded count, such that each consumer interaction with that object will result in a positive or negative point score. An example metric score table is shown below in Table 1, noting that the example scoring regime should not be seen as limiting and that any suitable scoring regime could be implemented for the recorded metrics.

TABLE 1

| Metric Type | Score Per Count |
| --- | --- |
| Asset Impressions | +1 |
| Asset Clicks | +2 |
| Engagement Offer Take-Ups | +2 |
| Engagement Offer Skips/Declines | −2 |
| Module Impressions | +1 |
| Module Completions | +2 |
| Advertisement Impressions | +1 |
| Further Information | +1 |
| Advertisement Take-Ups | +2 |
| Advertisement Skips | −1 |
| Advertisement Declines | −2 |
| Engagement Offer/Advertisement Shares | +1 |

The revenue score is determined by the ranking engine 118 by evaluating how much revenue resulted through presentation of the engagement objects to consumers. In a particular embodiment this is achieved by evaluating the revenue resulting from offer take-ups which may, for example, be calculated by multiplying the take-up count by the commission or fixed fee paid by the advertiser 14, though it will be understood any measure of revenue could equally be utilised for determining revenue depending only on the desired implementation. Once the engagement and revenue scores have been determined, the ranking engine 118 sums or otherwise combines the two scores to produce a combined engagement and revenue score and at step S8a outputs a listing of the highest ranking objects (based on their combined scores) to the engagement engine 116. It will be understood that any combination of engagement score and revenue score may be evaluated by the ranking engine and need not simply be the sum of the two scores. For example, the ranking algorithm implemented by the ranking engine 118 may apply a greater weighting to the determined engagement score than for the revenue score, so as to enable selection of engagement objects that are more likely to keep a consumer engaged during an engagement journey, in turn resulting in greater sustainability of the model. In this regard, the ranking engine 118 may be configured to dynamically adjust the weightings responsive to determining that levels of consumer engagement have fallen below a predefined threshold. This may be applied on an individual basis (i.e. by an evaluation of the metrics for a particular consumer) or across the consumer base as a whole (i.e. by an evaluation of the aggregated metrics).

In a particular object retrieved at step S5a does not have any behavioural metrics recorded in association therewith, then the selection of this object for inclusion in the engagement journey can be randomised.

At step S9a the engagement engine 116 selects the highest ranking engagement objects for inclusion in the engagement journey. According to embodiments described herein, each engagement journey consists of one engagement offer (i.e. displayed by way of an asset) followed by a number of modules and advertisements which is determined based on the determined interfacing context and/or consumer attribute(s). For example, an interfacing context representative of a consumer accessing an e-commerce website on their mobile phone may include a lesser number of modules/advertisements than for a consumer who is reading an article on a desktop computer. It will be appreciated that any number of different module/asset/offer configuration rules may be implemented utilising the gathered engagement data and behavioural data, depending only on the desired implementation.

At step S10a, the engagement engine 118 instructs the widget script 121 to present the engagement journey to the consumer as afore-described.

Example Engagement Journeys

Figure 6:
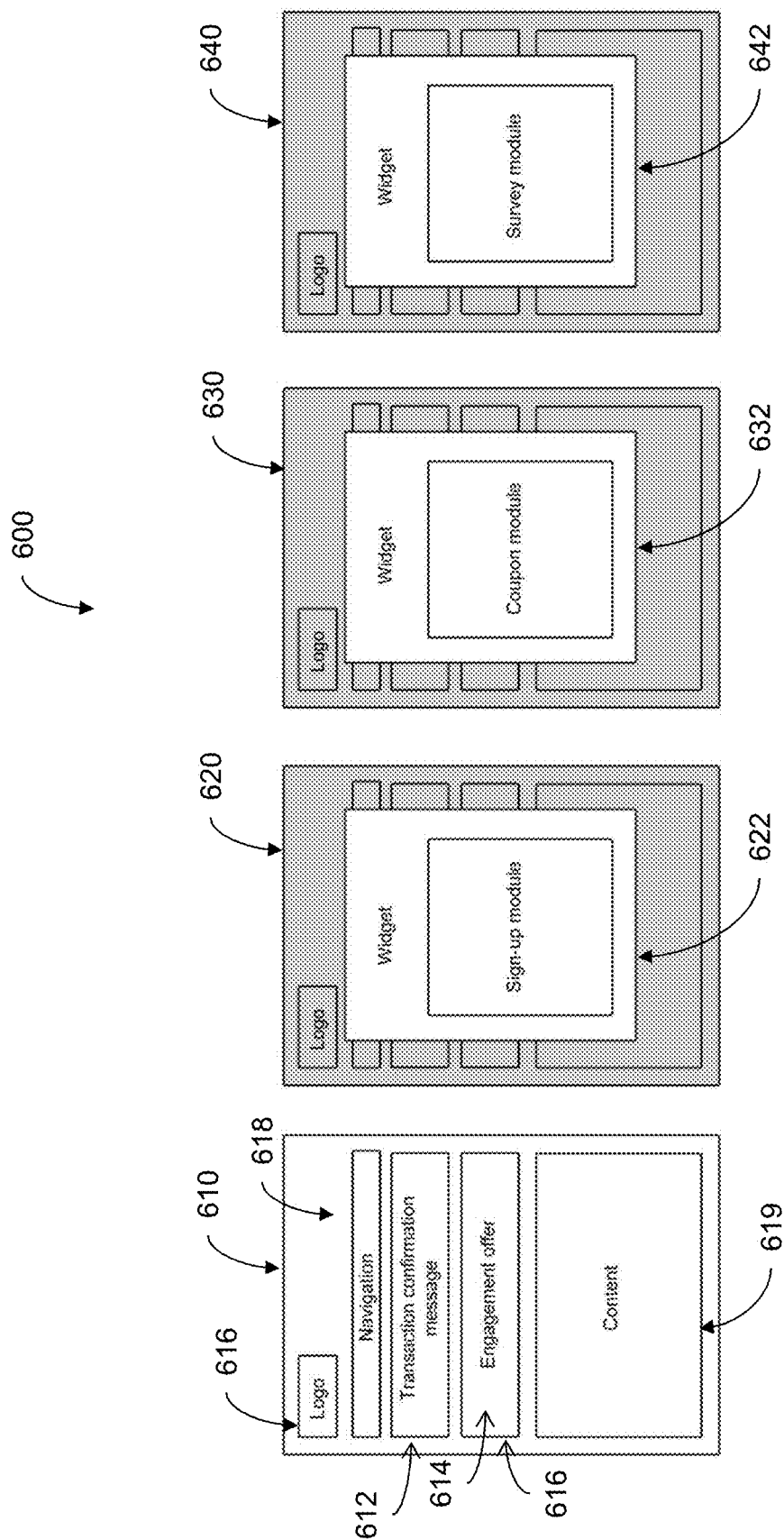
FIG. 6 shows an example engagement journey for a user transacting on an e-commerce website, in accordance with an embodiment.

FIG. 6 shows four example screen wireframes which serve to illustrate an engagement journey 600, in this case based on a consumer interfacing with an e-commerce website. It will be understood that the engagement objects shown in FIG. 6 are only examples of the different engagement objects that might be selected by the engagement engine 116 for inclusion in a particular journey.

Wireframe 610 shows a confirmation screen which is presented to the consumer in a final stage of a transaction placed with the e-commerce website. As illustrated, the confirmation screen includes a transaction confirmation message 612 confirming that the consumer's transaction was successful. Immediately below the transaction confirmation message 612 is an engagement offer 614 selected from the objects database 115. In this example, the engagement offer 614 is presented in an asset being in the form of an inline text box 615. It will be understood that that other assets may equally be used to present the engagement offer (e.g. by way of a pop-up message, etc.) and the actual placement of the asset may vary depending on the desired implementation. Various other items of digital content are also displayed on the confirmation screen, including a publisher logo 616, navigation bar 618 and any relevant publisher content 619.

By way of example, the e-commerce website may be an online ticket sales website and the consumer may have just completed a ticket purchase for their favourite band. In this case, the engagement data collected by the widget script 121 may, for example, comprise details of the transaction (e.g. band name, ticket price, etc.) which are derived from the website HTML code. The resultant engagement offer may, for example, be the chance to win VIP backstage passes to the event.

Responsive to the consumer engaging with the offer by clicking in the box 615, the widget script 121 is instructed to display a module in the form of a pop-up sign up module 622 which overlays the confirmation screen (see wireframe 620). In this case, the sign up module 622 prompts the consumer to enter the necessary details for signing up for the engagement offer. Various fields in the sign-up module 622 may be pre-populated by the widget script 121 using details entered by the consumer while completing the transaction on the e-commerce website (e.g. name, address, date of birth, etc.). Using the example from above, the sign up module 622 may prompt the consumer to confirm their personal details for entering the VIP backstage pass promotion.

After having completed the sign up module 622, the widget script 121 is instructed to display a coupon pop-up module 632 including one or more coupon advertisements selected from the engagement objects database 115 (see wireframe 630). For example, the selected coupons may provide discounts on travel related services provided by a selection of the advertisers 14.

Wireframe 640 depicts a final module for the engagement journey in the form of a survey module 642 which displays one or more surveys that the consumer has the option of completing. For example, the survey module 642 may display a political survey with the consumer's answers captured by the widget script 121 and communicated back to the engagement engine 116 for storing in the engagement behavioural database 114. Although not illustrated in the widget screens of FIG. 6, each of the modules displayed by the widget script 121 include an option for the consumer to skip that module, which is recorded by the widget scrip 121 for increment the associated behavioural metric.

Figure 7:
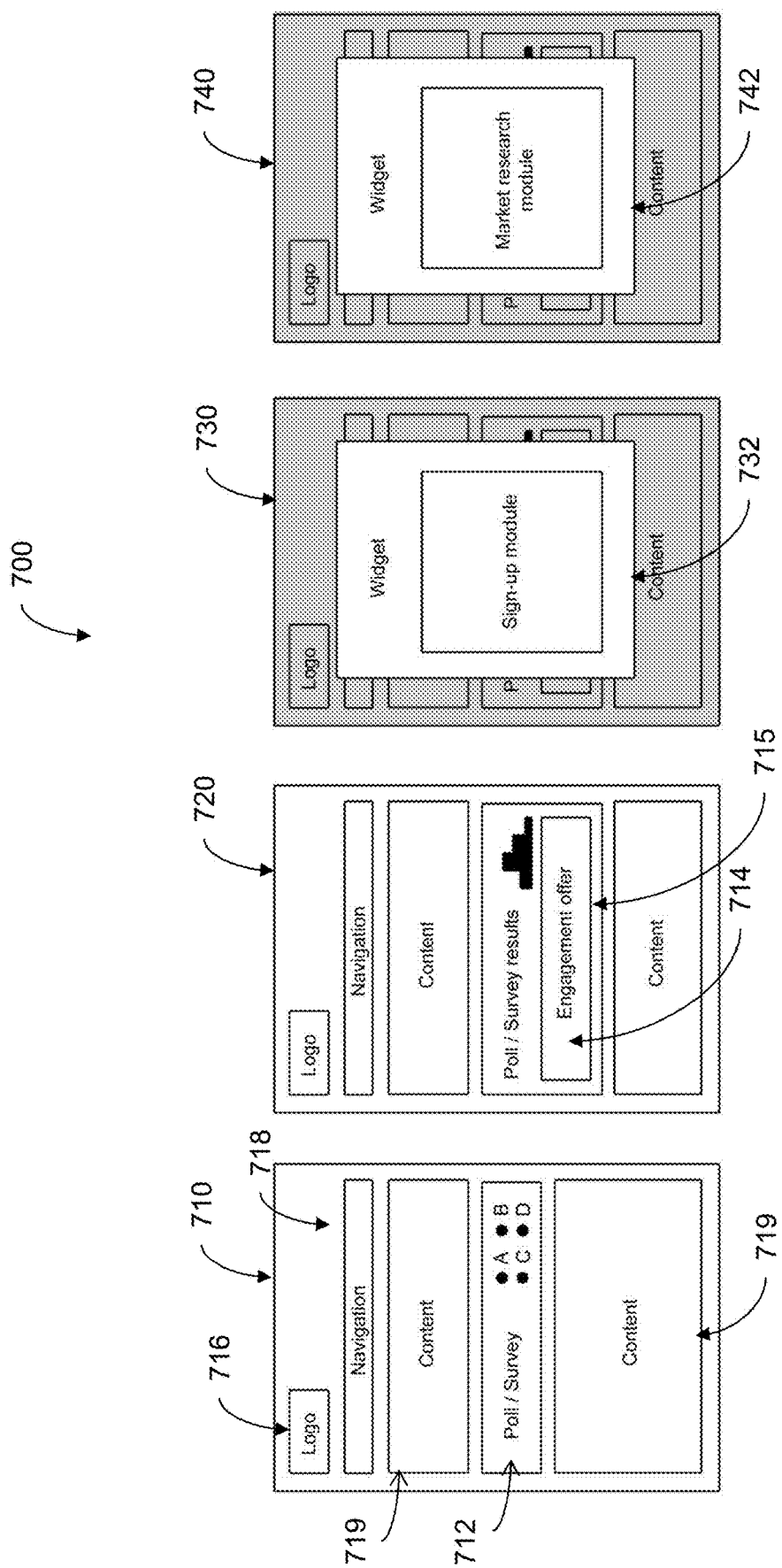
FIG. 7 shows an example engagement journey for a user transacting with a poll/survey on a publisher website, in accordance with an embodiment.

With reference to FIG. 7, there is illustrated another example engagement journey. In this example, the consumer is completing a poll on a news website which asks the consumer to select their favourite travel destination (e.g. by way of selectable radio buttons corresponding to different travel destinations). Screen wireframe 710 shows an example screen layout for the publisher site whereby the poll 712 is positioned between related publisher content 719. Again, a logo 716 and navigation bar 718 are also displayed.

Responsive to the consumer responding to the poll (i.e. by selecting one of the radio buttons), the widget script 121 is triggered to display an engagement offer 714 in an inline text box 715 immediately below the results of the poll (see wireframe 720). Using the example from wireframe 710, the engagement offer might be the chance to win free flights.

Responsive to the consumer clicking the box 715, the widget script 121 is programmed to display a sign-up module 732 for confirming the consumer details to enter the promotion, as shown in wireframe 730.

Wireframe 740 depicts the final screen presented to the consumer as part of the engagement journey, whereby they are presented with a market research module 742 asking a series of market research questions.

From the above examples, it can be seen that not all modules presented to a consumer during the journey need include explicit advertising content. For example, where only a small or no behavioural or other consumer attribute data is recorded for the consumer, the engagement engine 116 may present a survey (as depicted in wireframe 740) or the like in one of the modules seeking further information about the user, which may then be used to dynamically determine the advertising content of subsequent modules to be presented in an engagement journey.

Further, according to some embodiments, dependent on a consumer response to one or more modules, the number and or advertising content or otherwise of subsequent modules may be dynamically modified by the engagement engine 116 so as to optimise the relevance of the engagement journey. For example, where the consumer has skipped three modules in a row, the engagement engine 116 may be programmed to determine that the advertisements presented in those modules are not of any value to the consumer (even though they may have achieved high engagement and revenue scores from past engagements). As such, the engagement engine 116 may subsequently select other advertisements for presenting in subsequent module that are selected based on one or more different attributes.

In a particular embodiment, the advertisement system 10 may be configured to serve engagement offers and advertisements to consumers that are interacting with digital content by way of a native mobile application. In a particular embodiment, this is achieved by placing the widget script 121 on an i-frame embedded into the mobile application. It will be understood that other techniques for implementing the data-gatherer script may also be utilised and are within the purview of the skilled person.

In an alternative embodiment to that described above, rather than evaluating context data and/or user consumer attribute data for determining which engagement offers to present, the advertisement system (and more particularly the ranking engine 118) may instead base the selection on a historical performance of the engagement offers stored in the objects database 115. In a particular embodiment, the historical performance may be measured in much the same manner as for the engagement score, but focused only on those metrics relating to the engagement offer 18. For example, the historical performance may be calculated by summing the engagement offer take-ups and engagement offer skips/declines count. The ranking engine 118 may additionally apply a filter when determining the performance score such that only those scores that have recorded within some predefined time period are evaluated to keep up to date with current trends.

Further Detail of System Configuration

The server computer 112 on which the advertisement system 10 is implemented can be any form of suitable server computer that is capable of communicating with the consumer devices 106. The server 112 may include typical web server hardware including a processor, motherboard, memory, hard disk and a power supply. The server also includes an operating system which co-operates with the hardware to provide an environment in which software applications can be executed. In this regard, the hard disk of the server is loaded with a processing module which, under the control of the processor, is operable to implement the various afore-described engagement and ranking engines 116, 118 for determining engagement offers and advertisements.

According to the illustrated embodiment, the mobile devices are Internet-enabled smartphones. The smartphones are equipped with the necessary hardware and software to communicate with the web service. The smartphone and web service communicate over a network which, in this case, is a mobile broadband network 108. Although not illustrated in FIG. 1, the network 108 includes standard network elements including a base station controller, home location register, mobile switching centre, message centre, equipment identity register, and message gateway (although it will be appreciated that any suitable network connection may be utilised including private/public wireless networks, etc.).

It will be appreciated that the user computer device 106 could be any suitable form of network-enabled computing device. For example, the user computer device may be a general purpose computer or a special purpose device including a smart phone (as afore-described), tablet, or the like. Details of such devices (e.g. processor, memory, displays, data storage devices) are omitted for the sake of clarity.

It will be appreciated that a distinct advantage arising through use of a third party advertisement system 10 (as described above) is the ability to provide a platform which allows multiple advertisers 14 to connect to multiple end users 16 across a range of different subscribing publisher sites 12. Thus, the advertising system 10 may provide advertisers 14 with a broad ranging and immediate set of publisher sites 12 with whom they can partner to display their advertisements. Further, the ability to inter-connect stakeholders in this manner allows the advertising system 10 to provide a rich and deep pool of advertising content that can be drawn on to better match individual consumers with individual advertisers, in turn increasing the likelihood of a positive engagement. It will also be appreciated that this rich and deep pool addresses the variability in supply and demand of advertising on publisher sites.

Yet another advantage arising through such an implementation is the ability to maintain a database storing behavioural metrics for consumers across a range of different publisher sites. Thus, even if a consumer has not previously accessed one of the subscribing publisher sites, the advertisement system 10 may still be able to provide tailored advertising to that consumer when visiting the new publisher site based on behaviour metrics recorded for that consumer based on past engagements while visiting other subscribing publisher sites. Thus, it can be seen that engagement model as described herein advantageously meets the needs of all stakeholders, and not just a subset thereof (as is the case for conventional methods).

Digital Referral Marketing

In addition to increasing the efficacy of advertiser messages (i.e. through increased consumer engagement), a further advantage arising through implementation of the third party advertisement system 10 is the ability to provide a digital form of "word of mouth advertising" whereby advertisers may advantageously be provided with instant qualified referrals that are determined to be of interest to the consumer across any of the subscribing publisher sites 12.

Digital referrals can be implemented by the advertising system 10 in a number of ways depending on the goals of the advertising business (hereafter "advertiser"), as will now be described. For each of the example embodiments described below, the advertiser offers will broadly be referred to as "digital referral objects" and the third party advertisement system 10 referred to as a "third party referral provider". It follows that the selection, presentation and acceptance of the digital referral objects is carried out in the same manner as for the advertiser offers, previously described with reference to FIGS. 1 to 7. According to each of the embodiments described below, the advertiser has the ability to target particular customers through specifying particular engagement/attribute data they wish to associate with their digital referral object (i.e. as previously described with reference to FIG. 3).

Retail Referral Campaign

This particular embodiment may be advantageous for advertisers in the retail space that use offers, sales, promotions and other retail related mechanisms for driving sales. Accordingly, in this particular embodiment the digital referral objects take the form of retail related advertising offers (e.g. coupons, promotional codes, and the like) that are presented to the consumer on a post-transactional page of the subscribing publisher site, effectively acting as a "thank you" for the purchase made or action taken by the consumer.

Sales Referral Campaign

This particular embodiment may be advantageous for advertisers with outbound sales capabilities that want potential customers 'opting in' to receive a person-to-person sales interaction (e.g. via an outbound call, e-mail, etc.). Accordingly, in this particular embodiment, the digital referral object takes the form of an offer to receive further information from the advertiser. The offer may be accompanied by the chance to win a prize, or some other enticement provided by the advertiser. Acceptance of the offer may, for example, require the consumer to enter contact information which is then recorded and passed on to the advertiser for making the contact (i.e. by the widget script 121).

Post acceptance of the advertising offer, the consumer may be contacted by the publisher 12 endorsing the advertiser. This may increase the likelihood of the consumer completing the offer (i.e. nurturing a consumer into a customer), particularly if there is some good will or trust between the consumer and publisher 12. Again, this may be facilitated by way of the widget script 121 which passes the contact information to the publisher 12 for subsequent contact. In a particular embodiment, the contact from the publisher 12 may be an e-mail to the consumer increasing awareness and understanding, preparing them for advertiser follow up and helping to improve call-back conversion. It will be understood that this post acceptance publisher endorsement may be implemented for any of the digital referral implementations described herein.

Customer Referral Campaign

This particular embodiment may be advantageous for advertisers who wish to grow their business by referring consumers to "opt-in" to receive ongoing advertiser communications. For example, advertisers with ongoing sale activity via e-mail (e.g. businesses in retail or travel industry) may use the customer referral mechanism to build a customer e-mail database for subsequent e-mail campaigns. Accordingly, in this particular embodiment, the digital referral object takes the form of an offer to receive ongoing communications from the advertiser. The offer may be accompanied by the chance to win a prize, or some other enticement provided by the advertiser. Acceptance of the offer may, for example, require the consumer to enter contact information which is then recorded and passed on to the advertiser for making the contact (i.e. by the widget script 121).

Traffic Referral Campaign

This particular embodiment is tailored for advertisers looking to refer qualified consumers directly to their website, in turn exposing the consumer to the advertiser's content and sales processes. Traffic referrals may be particularly suited for businesses who wish to have the consumer transact on their own website with products and services suited to immediate sales. Accordingly, in this particular embodiment, the digital referral object takes the form of an offer to receive some particular offering from the advertiser that results in the consumer being directed to their website. This is achieved by the widget scrip 121 that recognises acceptance of the offer and subsequently re-directs the consumer's browser to a desired landing page (e.g. product-specific landing page) of the website.

Social Referral Campaign

This particular embodiment is tailored for advertisers looking to increase their social media profile by building an audience, establishing a social community and a forum of ongoing communications. Social referrals are particularly suited for advertisers without a direct interface with their customers, such as fast moving consumer goods and manufacturers of electronics/appliances. Accordingly, in this particular embodiment, the digital referral object takes the form of an invite to "like" or otherwise endorse an advertiser brand, product or service in exchange for some offer determined to be of interest to the consumer (e.g. an "instant win" prize, entry into a prize draw, access to member only coupons, discounts, etc.). The widget script 121 is programmed to recognise acceptance of the offer and in turn direct the user to the relevant social media website for completing the endorsement.

In a particular embodiment the aforementioned referral objects are presented to the consumer once they have engaged with the advertising system 10 (i.e. through acceptance of an engagement offer). In an alternative embodiment, the consumer may be presented with the referral objects without having been exposed to an engagement offer, e.g. on a post-transaction page of a publisher website, or at some other stage while accessing a publisher site.

It will be understood that the advertising system 10 may implement various techniques for deriving advertising from the above digital referral campaigns. For example, the campaigns may be charged by cost per referral (CPR), with the rate varying depending on the appeal of the advertiser offer and demand by other advertisers for the same target customer.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A computer implemented method for linking a computer user to an advertising message by way of a chosen encouraging intermediate engagement offer which is operable to drive a higher level of engagement with the advertising message than if the advertising message was present without the chosen encouraging intermediate engagement offer, the method comprising:

using a data processing system and providing computer program code to be delivered with publisher content to a computing device operated by the computer user and which computing device comprises an interface arranged to display publisher content, the computer program code operably implemented by a processor of the computing device to perform the additional steps of:

gathering engagement data associated with use of the Internet by a targeted user, the engagement data derived from interactions made by the user with the user computer and related to at least one of the following:
an attribute of the publisher content;
an interaction with the publisher content by the computer user; and
an attribute of the user;

communicating the engagement data as it is gathered to a remote advertising system and implementing an engagement engine, the engagement engine operable to:

continuously evaluate the gathered engagement data to determine whether a predefined engagement trigger has occurred, the predefined engagement trigger being representative of a user response or action entered on the user computer that is contextually relevant for presentation of an encouraging intermediate engagement offer;

responsive to determining that the predefined engagement trigger has occurred, selecting an encouraging intermediate engagement offer that is not tied to subsequent advertising from a pool of different encouraging intermediate engagement offers stored by the remote advertising system that is deemed relevant to the evaluated engagement data and wherein, where multiple encouraging intermediate engagement offers are deemed to be relevant, the engagement engine implements a ranking algorithm operable to dynamically rank the multiple relevant encouraging intermediate engagement offers based on at least one of:

(a) an engagement score determined from one or more performance metrics recorded from past user interactions with the corresponding encouraging intermediate engagement offers; and/or (b) a revenue score determined from one or more revenue metrics recorded from past user interactions with the corresponding encouraging intermediate engagement offers, and wherein the engagement engine selects the chosen encouraging intermediate engagement offer to present based on the dynamic rankings;

causing the user computer to insert the chosen encouraging intermediate engagement offer into the publisher content for displaying on the interface to the computer user, wherein neither the display nor acceptance of the chosen encouraging intermediate engagement directly translates into any advertising revenue for the remote advertising system;

implementing the computer program code to determine an acceptance of the chosen encouraging intermediate engagement offer by the computer user based on user interaction on the user computer with the chosen encouraging intermediate engagement offer; and following the determined acceptance, presenting an advertising message comprising one or more advertisements selected from a pool of different advertisements on the user computer interface and wherein user interactions with each of the presented advertisements are gathered by widget script and communicated to the remote advertising system for use in selecting subsequent advertisements, and whereby the selection of the chosen encouraging intermediate engagement offer is made independently of any subsequent advertisements to encourage positive engagement by the user with the remote advertising system prior to presentation of the advertising message.

2. A computer implemented method in accordance with claim 1, wherein the computer program code and publisher content are provided in response to the user accessing a publisher website or mobile application.

3. A computer implemented method in accordance with claim 2, wherein both the chosen encouraging intermediate engagement offer and subsequent advertisements are integrated with the publisher content and viewable on the publisher website/mobile application.

4. A computer implemented method in accordance with claim 2, wherein the engagement data comprises transaction related data for a transaction carried out on the publisher site.

5. A computer implemented method in accordance with claim 4, wherein, where the transaction related data is representative of at least one of a type, value and location of the goods and/or services for the transaction.

6. A computer implemented method in accordance with claim 1, wherein the engagement data is representative of a content type of the publisher content.

7. A computer implemented method in accordance with claim 6, herein the content type is determined by the computer program code based on an evaluation of a URL which was accessed by the computing device in order to receive the publisher content.

8. A computer implemented method in accordance with claim 1, wherein engagement data is representative of an attribute of the computer user.

9. A computer implemented method in accordance with claim 8, wherein the engagement data is representative of a time and/or location of the computer user when accessing the publisher content.

10. A computer implemented method in accordance with claim 8, wherein the engagement data is representative of one or more of the following user attributes: age, gender, social media profile.

11. A computer implemented method in accordance with claim 1, wherein the computer program code is further operable to evaluate a cookie stored by the user computing device in order to determine the engagement data.

12. A computer implemented method in accordance with claim 1, wherein the engagement data is representative of user feedback gathered by the computer program code from one or more previous interactions with the advertising system by the user and/or other users having one or more like user attributes.

13. A computer implemented method in accordance with claim 1, wherein the selection of advertisements is additionally based on the engagement data.

14. A computer implemented method in accordance with claim 13, further comprising the step of selecting a number of the advertisements to present to the computer user based on the engagement data.

15. A system for linking a user to an advertising message by way of a chosen encouraging intermediate engagement offer which is operable to drive a higher level of engagement with the advertising message than if the advertising message was present without the chosen encouraging intermediate engagement offer, the system comprising:
  a remote advertising system implementing a database storing encouraging intermediate engagement offers and advertisements;
  a publisher resource operable to cause computer program code to be delivered with publisher content to a computing device operated by the user responsive to the computing device accessing the publisher resource, the computer program code operable to be implemented by a processor of the computing device to perform the additional steps of:
    gathering engagement data associated with use of the internet by a targeted user, the engagement data derived from interactions made by the user with a user interface implemented by the user computing device and related to at least one of the following:
      an attribute of the publisher content;
      an interaction with the publisher content by the computer user; and
      an attribute of the user;
    communicating the engagement data as it is gathered to the remote advertising system implementing an engagement engine, the engagement engine operable to:
      continuously evaluate the gathered engagement data to determine whether a predefined engagement trigger has occurred, the predefined engagement trigger being representative of a user response or action that is contextually relevant for presentation of the chosen encouraging intermediate engagement offer;
      responsive to determining that the predefined engagement trigger has occurred, selecting an encouraging intermediate engagement offer that is not tied to subsequent advertising to encourage positive engagement by the user with the remote advertising system from the database that is relevant to the evaluated engagement data and wherein, where multiple encouraging intermediate engagement offers are deemed to be relevant, the engagement engine implements a ranking algorithm operable to dynamically rank the multiple relevant encouraging intermediate engagement offers based on at least one of:
        (a) an engagement score determined from one or more performance metrics recorded from past user interactions with the corresponding encouraging intermediate engagement offers;
        (b) a revenue score determined from one or more revenue metrics recorded from past user interactions with the corresponding encouraging intermediate engagement offers, and
      wherein the engagement engine selects the chosen encouraging intermediate engagement offer to present based the rankings and independently of any subsequent advertisements to drive the desired higher level of engagement; and
    wherein the computer program code is implemented to:
      cause the user computer to display the chosen encouraging intermediate engagement offer together with the publisher content on the user interface of the user computer, wherein neither the display nor acceptance of the chosen encouraging intermediate engagement directly translates into any advertising revenue for the remote advertising system;
      determine an acceptance of the chosen encouraging intermediate engagement offer by the computer user based on a user interaction with the chosen encouraging intermediate engagement offer; and
      following the determined acceptance, presenting an advertising message comprising one or more advertisements selected from a pool of different advertisements on the user interface, and wherein user interactions with each of the presented advertisements are gathered by widget script and communicated to the remote advertising system for use in selecting subsequent advertisements.

16. A computer implemented method in accordance with claim 15, wherein the selection of the chosen encouraging intermediate engagement offer is additionally made such that there is no direct advertising benefit to subsequent advertisers of selected advertisements through presentation of the chosen encouraging intermediate engagement offer to the computer user other than encouraging positive engagement by the user with the advertising system prior to presentation of the advertising message.

17. A computer implemented method in accordance with claim 1, wherein the selection of the chosen encouraging intermediate engagement offer is additionally made such that there is no direct advertising benefit to subsequent advertisers of selected advertisements through presentation of the chosen encouraging intermediate engagement offer to the computer user other than encouraging positive engagement by the user with the advertising system prior to presentation of the advertising message.

18. A system for linking a user to an advertising message by way of a chosen encouraging intermediate engagement offer which is operable to drive a higher level of engagement with the advertising message than if the advertising message was present without the chosen encouraging intermediate engagement offer, the system comprising:
  a remote advertising system implementing a database storing encouraging intermediate engagement offers and advertisements;
  a publisher resource operable to cause computer program code to be delivered with publisher content to a computing device operated by the user responsive to the computing device accessing the publisher resource, the computer program code operable to be implemented by a processor of the computing device to perform the additional steps of:
    gathering engagement data associated with use of the internet by a targeted user, the engagement data derived from interactions made by the user with a user interface implemented by the user computing device and related to at least one of the following:
      an attribute of the publisher content;
      an interaction with the publisher content by the computer user; and
      an attribute of the user;

communicating the engagement data as it is gathered to the remote advertising system implementing an engagement engine, the engagement engine operable to:

continuously evaluate the gathered engagement data to determine whether a predefined engagement trigger has occurred, the predefined engagement trigger being representative of a user response or action that is contextually relevant for presentation of the chosen encouraging intermediate engagement offer;

responsive to determining that the predefined engagement trigger has occurred, selecting an encouraging intermediate engagement offer that is not tied to subsequent advertising to encourage positive engagement by the user with the remote advertising system from the database that is relevant to the evaluated engagement data and wherein, where multiple encouraging intermediate engagement offers are deemed to be relevant, the engagement engine implements a ranking algorithm operable to dynamically rank the multiple relevant encouraging intermediate engagement offers based on at least one of:

(a) an engagement score determined from one or more performance metrics recorded from past user interactions with the corresponding encouraging intermediate engagement offers;

(b) a revenue score determined from one or more revenue metrics recorded from past user interactions with the corresponding encouraging intermediate engagement offers, and wherein the engagement engine selects the chosen encouraging non-advertising intermediate engagement offer to present based the rankings with the subject matter of the chosen encouraging intermediate engagement offer being unrelated to the subject matter of subsequent advertisers or advertising messages; and wherein the computer program code is implemented to:

cause the user computer to display the chosen encouraging intermediate engagement offer together with the publisher content on the user interface of the user computer, wherein neither the display nor acceptance of the chosen encouraging intermediate engagement directly translates into any advertising revenue for the remote advertising system;

determine an acceptance of the chosen encouraging intermediate engagement offer by the computer user based on a user interaction with the chosen encouraging intermediate engagement offer; and following the determined acceptance, presenting an advertising message comprising one or more advertisements selected from a pool of different advertisements on the user interface, and wherein user interactions with each of the presented advertisements are gathered by widget script and communicated to the remote advertising system for use in selecting subsequent advertisements.

19. A computer implemented method in accordance with claim 18, wherein the chosen encouraging intermediate engagement offer is not selling a particular product or service.

* * * * *